United States Patent [19]
Cole

[11] 3,968,946
[45] July 13, 1976

[54] EXTENDABLE AERODYNAMIC FAIRING

[75] Inventor: James B. Cole, Mercer Island, Wash.

[73] Assignee: The Boeing Company, Seattle, Wash.

[22] Filed: Mar. 31, 1975

[21] Appl. No.: 563,297

[52] U.S. Cl. .............................. 244/42 D; 244/130
[51] Int. Cl.² ................................................. B64C 7/00
[58] Field of Search ............ 244/130, 42 CA, 42 D, 244/42 DA, 42 DB, 42 DC, 42 R, 44, 46, 43

[56] References Cited
UNITED STATES PATENTS

| | | | |
|---|---|---|---|
| 2,090,775 | 8/1937 | Wright | 244/130 |
| 2,129,824 | 9/1938 | DeSeversky | 244/130 |
| 2,441,694 | 5/1948 | Ehrhardt | 244/40 |
| 2,851,229 | 9/1958 | Clark | 244/44 |
| 2,912,190 | 11/1959 | MacDonough | 244/44 |
| 2,915,948 | 12/1959 | Fehring | 244/130 |
| 2,920,844 | 1/1960 | Marshall et al. | 244/130 |
| 2,927,749 | 3/1960 | Brownell | 244/130 |
| 3,101,920 | 8/1963 | Fradenburgh | 244/130 |
| 3,114,525 | 12/1963 | Morgan et al. | 244/130 |
| 3,114,526 | 12/1963 | Morgan | 244/130 |
| 3,175,791 | 5/1965 | Toms | 244/130 |
| 3,184,187 | 5/1965 | Isaac | 244/43 |
| 3,244,384 | 4/1966 | Bracka et al. | 244/42 CA |
| 3,412,962 | 11/1968 | Killian | 244/130 |
| 3,432,125 | 3/1969 | Schroeder, Jr. | 244/130 |
| 3,481,562 | 12/1969 | Deplante | 244/42 |
| 3,486,720 | 12/1969 | Seglem et al. | 244/46 |
| 3,499,622 | 3/1970 | Lugan et al. | 244/130 |
| 3,504,870 | 4/1970 | Cole et al. | 244/42 |
| 3,645,477 | 2/1972 | Kratschmar et al. | 244/46 |
| 3,734,431 | 5/1973 | Rhodes et al. | 244/46 |
| 3,797,784 | 3/1974 | Muller | 244/130 |

FOREIGN PATENTS OR APPLICATIONS

| | | | |
|---|---|---|---|
| 349,879 | 6/1931 | United Kingdom | 244/43 |
| 832,181 | 4/1960 | United Kingdom | 244/130 |

OTHER PUBLICATIONS

Aviation Week and Space Technology, "South Africa Buys A-300B," Aug. 18, 1975, p. 23.

*Primary Examiner*—Trygve M. Blix
*Assistant Examiner*—Galen L. Barefoot
*Attorney, Agent, or Firm*—Christensen, O'Connor, Garrison & Havelka

[57] ABSTRACT

An extendable fairing for use between two aerodynamic surfaces (e.g., the engine nacelle and wing leading edge flap) of an aircraft is disclosed. The illustrated embodiment of the invention comprises a fixed fairing section, extending outwardly from an engine nacelle, and an extendable fairing section, housed within the fixed fairing section. During cruise, when the flaps are withdrawn, the extendable fairing section is withdrawn. During takeoff and landing, or other conditions when the leading edge flaps are extended, the extendable fairing section is extended and fills the gap between the fixed fairing section and the leading edge flap.

6 Claims, 4 Drawing Figures

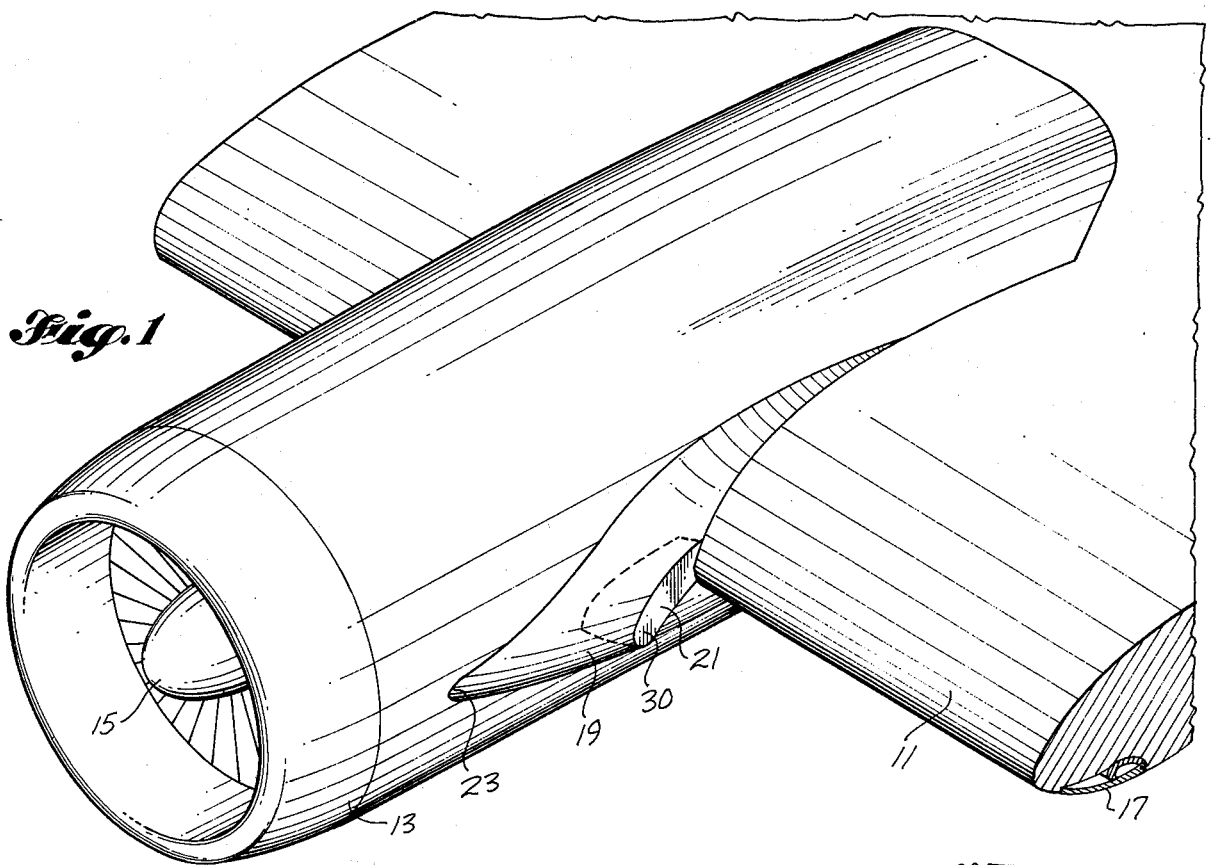
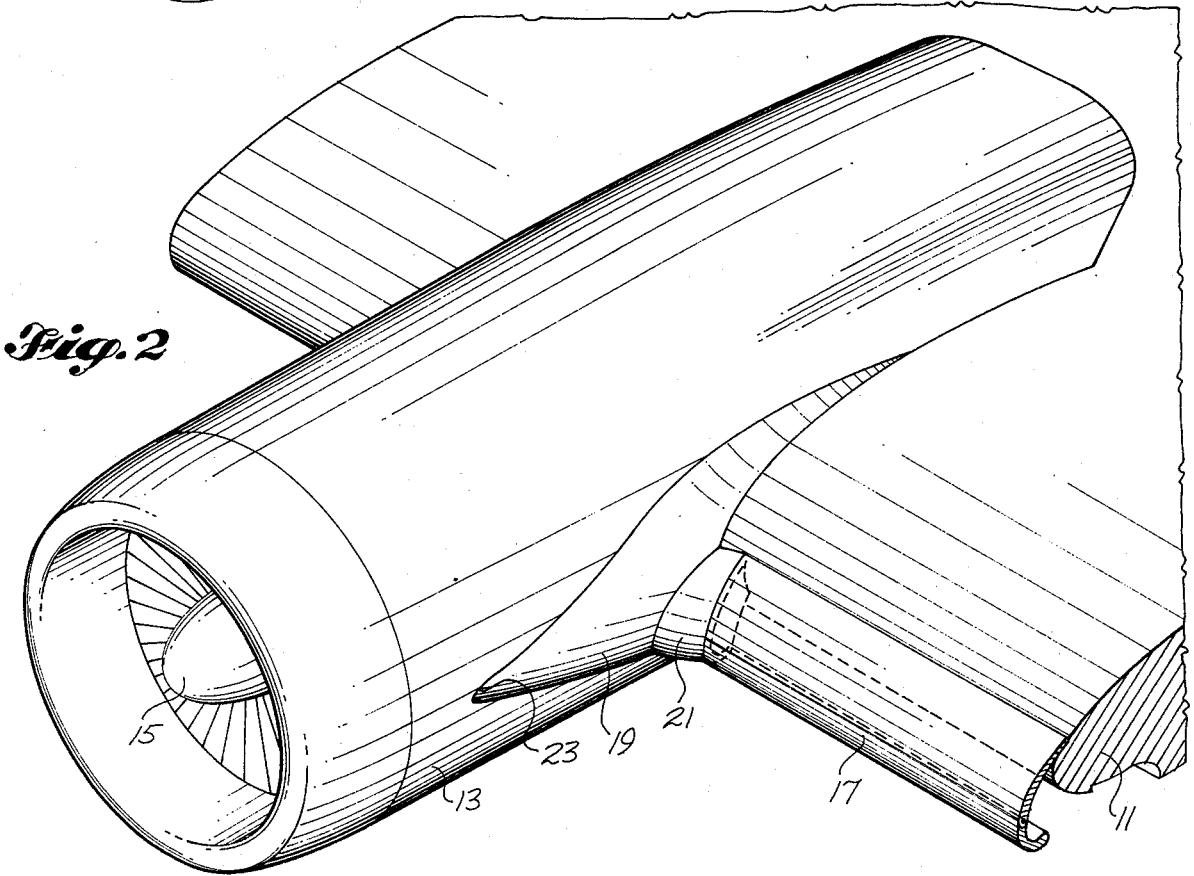

EXTENDABLE AERODYNAMIC FAIRING

BACKGROUND OF THE INVENTION

This invention is directed to aircraft and more particularly to fairings suitable for use between two aerodynamic surfaces of an aircraft.

The present invention was developed for use, as will be better understood from the following description, as a fairing located between an engine nacelle and a leading edge flap. However, it will be appreciated, and should be understood, that the invention can also be utilized in other environments where two aerodynamic surfaces join and a fairing is required.

Many multiple engine aircraft are designed such that an interface exists between the nacelles of the aircraft engines and its wings. In addition, many such aircraft have leading edge wing flaps that are usually withdrawn when the aircraft is cruising and extended during takeoff and landing (and under other lower speed operating conditions). One example of an aircraft wherein such an interface exists is an upper surface blowing aircraft. In an upper surface blowing aircraft, jet engines are located above and slightly forward of the wings of the aircraft. The engines and the structure supporting them are surrounded by nacelles that interface with the leading edge of their associated wings. During normal flight, the exhaust stream is directed rearwardly to generate forward thrust in a conventional manner. Upon landing and takeoff, trailing edge flaps are employed with such aircraft to increase the camber and chord of the wing and at the same time to form a continuously curved, downward and rearward extension of the upper airfoil surface of the wing. When the trailing edge flaps are so extended, the exhaust stream traveling chordwise over the upper airfoil surface of the wing attaches itself by the Coanda effect to the downwardly and rearwardly curved surface to divert the exhaust stream downwardly and rearwardly. In this manner, a lift component, as well as a forward thrust component, is generated by the exhaust stream. The engine-generated lift component augments the conventional aerodynamic lift created by ambient air flow over the remaining portion of the wing to provide a STOL capability.

In addition to trailing edge flaps, upper surface blowing aircraft also include leading edge flaps that are extended to create a wing curvature that has high lift under low speed operating conditions, e.g., during takeoff and landing. The problem solved by the present invention relates to the interface between the leading edge flaps and the engine nacelles. Specifically, the curvatures of the engine nacelle and the leading edge flaps are such that it is difficult to maintain an acceptable aerodynamic surface where they interface. Often, because of this difficulty a gap exists between the leading edge flaps and the engine nacelle when the flaps are extended. This gap, because it is nonaerodynamic, results in poor flap performance and excessive drag.

In the past, in order to avoid poor flap performance and excessive drag, the gap between a leading edge flap and an engine nacelle has been filled in either of two ways. One way has been to fill the gap with a fairly large fixed fairing. The problem with this approach is that a large fixed fairing creates a drag penalty. The drag penalty exists not only when the flaps are extended, but also when the flaps are retracted, e.g., during cruise. Thus, while this approach overcomes some of the disadvantages of an unfaired interface, problems remain.

The second approach to filling the gap between an engine nacelle and a leading edge flap when the leading edge flap is extended has been to use an inflatable fairing. The problem with inflatable fairings is that their life is usually short and their maintenance cost is high. Thus, while solving the problem, inflatable fairings also have disadvantages.

Therefore, it is an object of this invention to provide an aerodynamic fairing suitable for use between two aerodynamic surfaces.

It is also an object of this invention to provide an aerodynamic fairing suitable for use between two aerodynamic members or surfaces that creates a minimal increase in frontal area, and therefore, creates a minimal increase in aircraft drag.

It is another object of this invention to provide an extendable aerodynamic fairing suitable for use between two aerodynamic members or surfaces.

It is a further object of this invention to provide an extendable aerodynamic fairing suitable for use between an aircraft engine nacelle and a leading edge flap.

It is yet another object of this invention to provide aerodynamic fairings suitable for use between the engine nacelles and the leading edge flaps of an upper surface blowing aircraft.

SUMMARY OF THE INVENTION

In accordance with principles of this invention, an extendable aerodynamic fairing suitable for use between two aerodynamic surfaces of an aircraft is provided. The extendable aerodynamic fairing comprises a fixed fairing section extending outwardly from one of said aerodynamic surfaces and an extendable fairing section, at least partially housed, when retracted, within the fixed fairing section. When needed, the extendable fairing section is extended outwardly so as to meet the other aerodynamic surface.

In accordance with further principles of this invention, the fixed fairing section is affixed to an engine nacelle in the region where the engine nacelle and its associated wing join. The extendable fairing section is located such that when the leading edge flap of the associated wing is extended, and the extendable section is extended, the leading edge flap and the extendable section join in an acceptable aerodynamic manner.

In accordance with yet other principles of this invention, the extendable fairing section includes an arm pivotably mounted inside of the fixed fairing section. In addition, an actuator (either electrical, hydraulic or pneumatic) extends between the fixed fairing section and the extendable fairing section. Actuation of the actuator rotates the extendable fairing section between its housed position within the fixed fairing section and its extended position whereat it joins the leading edge flap of the associated wing.

It will be appreciated from the foregoing brief summary that the invention overcomes the disadvantages of prior art aerodynamic fairings of the type discussed above. Since the aerodynamic fairing of the invention is retractable, it reduces, to a great extent, the drag losses created by a large, fixed aerodynamic fairing. In addition, because the aerodynamic fairing is mechanically movable, it can be formed of relatively rigid components, and thereby, avoid the problems of inflatable fairings discussed above.

BRIEF DESCRIPTION OF THE DRAWINGS

The foregoing objects and many of the attendant advantages of this invention will become more readily appreciated as the same become better understood by reference to the following detailed description when taken in conjunction with the accompanying drawings wherein:

FIG. 1 is a partial, perspective view of an upper surface blowing engine/wing combination illustrating a preferred embodiment of the present invention with the extendable fairing section and leading edge flaps being retracted;

FIG. 2 is a partial, perspective view of an upper surface blowing engine/wing combination illustrating a preferred embodiment of the present invention with the extendable fairing section and leading edge flaps in their extended position;

DESCRIPTION OF THE PREFERRED EMBODIMENT

Figure 3:
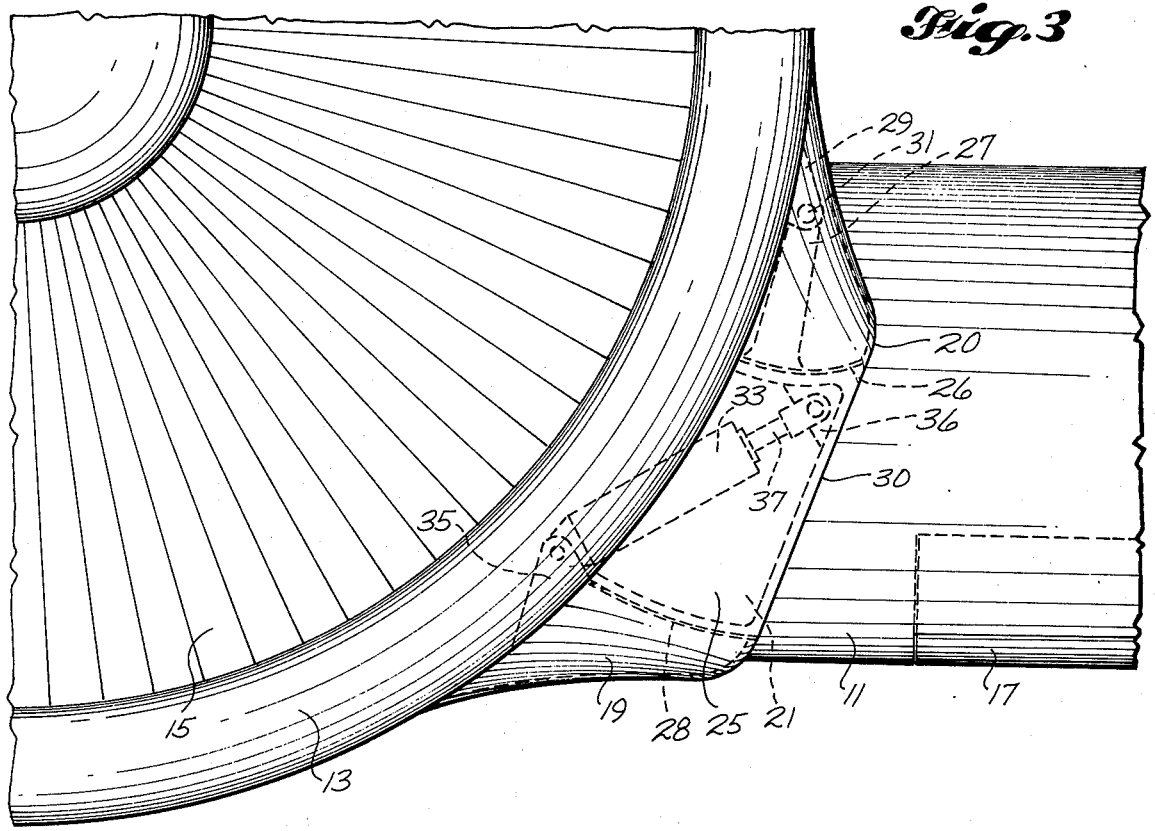
FIG. 3 is a front elevational view of a portion of the structure illustrated in FIG. 1.

As noted above, the invention was made in, and is described in a jet engine/wing environment wherein the engine's nacelle interfaces with the leading edge of the wing. However, the invention may also be used in other environments wherein two aerodynamic surfaces join.

Because it forms no part of the present invention, a mechanism for moving a leading edge flap of an aircraft wing between a retracted and an extended position is not illustrated and described. Such mechanisms are well-known and widely described in the prior art to which the present invention relates. Also, for illustration simplification purposes, the leading edge flap is only schematically illustrated in its extended and retracted positions.

FIG. 1 illustrates a wing 11 and a jet engine nacelle 13 within which a jet engine 15, such as a turbofan jet engine, is located. The jet engine/aircraft wing combination is illustrated as an upper surface blowing combination wherein the jet engine is supported by structural components (not illustrated) in front of, and slightly above, the leading edge of the wing 11. The exhaust of the engine 15 is directed by the nacelle 13 so as to flow over the upper surface of the wing 11. In a well-known manner, the engine exhaust diverges outwardly both toward and away from the aircraft fuselage (not illustrated) as it is emitted from the nacelle 13. When the engine exhaust is deflected down on the wing upper surface, the high energy (high velocity) gases accelerate the air passing over the upper surface of that portion of the wing to further reduce the pressure (Bernoulli effect) and increase the wing lift. If the trailing edge flaps (also not illustrated) are extended, additional lift is produced by the exhaust thrust component of the downward turned air stream (Coanda effect) over the trailing edge flaps. In other words, the wings include relatively large flaps that, when extended, direct the flow downwardly and rearwardly to create a thrust lift component.

Located at the leading edge of the wing 11 is a leading edge flap 17. The leading edge flap 17 is illustrated as retracted in FIG. 1 and extended in FIG. 2. Because of the curvature of the nacelle 13, the sweep back of the leading edge of the wing 11 and the leading edge flap 17 in the regions where they meet, a gap exists between the leading edge flap 17 and the nacelle 13 when the leading edge flap is extended. This gap is filled by the aerodynamic fairing of the invention, as hereinafter described.

The aerodynamic fairing of the invention comprises a fixed fairing section 19 and an extendable fairing section 21. The fixed fairing section 19 is affixed to the outer surface of the nacelle 13 about the leading edge of the wing 11. The illustrated fairing starts at a point 23, located well forward of the leading edge of the wing 11, and flares outwardly until it intersects the upper and lower surfaces of the wing 11. In addition, the fixed fairing section 19 diverges outwardly from the nacelle 13 to a plateau region 20. The plateau region 20 is defined by the outer surface of the extendable fairing 21 when it is withdrawn.

The fixed fairing section 19 includes a cavity 25 located between curved upper and lower ribs 26 and 28. The extendable fairing section 21 is mounted in the cavity and includes curved walls that correspond to the upper and lower curved ribs 26 and 28. In addition, the extendable fairing section has an outer surface 30 shaped similar to the shape of the plateau region 20. This shape is also similar to the cross-sectional shape of the leading edge flap 17 when it is extended. Thus, the shape is such that, when the extendable fairing section is extended in the manner hereinafter described, it joins the adjacent edge of the leading edge flap 17 in a smooth, continuous manner.

The extendable fairing section 21 includes an arm 27 extending upwardly from its upper curved surface, inside of the fixed fairing section. The arm 27 is rotatably attached to a bracket 29 by a suitable pin 31, the bracket 29 being affixed to the engine nacelle 13. The position of attachment, length of the arm 27, opening in the fairing and the curvature of the upper and lower walls of the extendable fairing section 21 is such that the extendable fairing section is rotatable in and out of the cavity 25 about the rotation point defined by the pin 31.

The extendable fairing section is moved by an actuator 33, which may be powered electrically, hydraulically or by other means. The actuator extends between a first actuator bracket 35 affixed to the engine nacelle and a second actuator bracket 36 affixed to a suitable point on the extendable fairing section 21. In a conventional manner, when the actuator 33 is energized, it moves its shaft 37 inwardly and outwardly. This action rotates the extendable fairing section 21 between its extended and retracted positions, about the pivot point defined by the pin 31.

Figure 4:
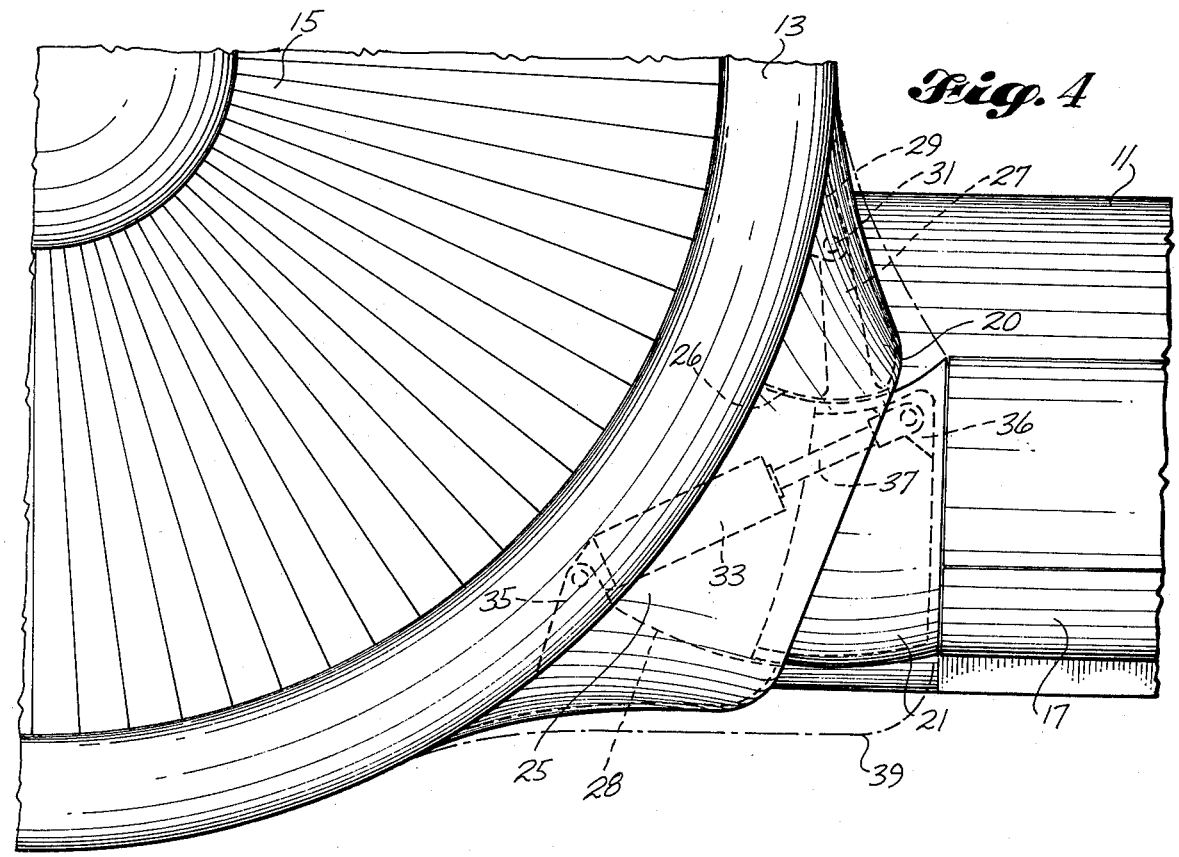
FIG. 4 is a front elevational view of a portion of the structure illustrated in FIG. 2.

It will be appreciated from the foregoing description of a preferred embodiment that the invention provides an extendable aerodynamic fairing that fills the gap normally existing between a leading edge flap and the nacelle of an engine/wing combination. The invention eliminates the necessity for, and therefor the disadvantages of, inflatable fairings. In addition, the invention overcomes the disadvantages of fixed fairings. In this regard, a fixed fairing useful in the environment illustrated in FIGS. 3 and 4 would normally fill the region outlined by the dash-dot lines 39. It will be appreciated from viewing FIG. 4 that the present invention provides substantially less frontal area. Thus, the present invention creates less drag, both when retracted (cruise) and when extended (low speed operation).

While a preferred embodiment of the invention has been illustrated and described, it will be appreciated by those skilled in the art and others that various changes can be made therein without departing from the spirit and scope of the invention. For example, the point of rotation defined by pin 31 may be changed in accordance with a particular environment of use. In addition, other types of mechanical moving mechanisms can be utilized. For example, mechanical linkage systems may be more suitable for use in certain environments than the simple hinge arrangement shown. Finally, as discussed above, the invention is useful in environments other than engine nacelle/leading edge environments. Hence, the invention can be practiced otherwise than as specifically described herein.

The embodiments of the invention in which an exclusive property or privilege is claimed are defined as follows:

1. An extendable aerodynamic fairing suitable for use between an engine nacelle and a wing leading edge flap for filling the gap between said engine nacelle and said wing leading edge flap when said wing leading edge flap is extended, said extendable aerodynamic fairing comprising:

a fixed fairing section attached to said engine nacelle in an aerodynamic manner, said fixed fairing section starting at a point on the outer surface of said nacelle substantially forwardly of the leading edge of the wing with which said leading edge flap is associated and flairing outwardly toward the upper and lower surfaces of said wing, said fixed fairing section also diverging outwardly into a plateau spaced from said nacelle, a cavity formed in said plateau, said cavity having an opening generally aligned with said leading edge flap when said leading edge flap is extended; and, an extendable fairing section mounted in said cavity in said fixed fairing section for lateral movement between a retracted position whereat said extendable fairing section is substantially entirely housed within said cavity and an extended position whereat said extendable fairing section is brought to a position adjacent to the nearest edge of said leading edge flap when said leading edge flap is extended, said extendable fairing section being formed such that it forms a smooth aerodynamic joint with said leading edge flap when positioned adjacent said leading edge flap and the leading edge flap is extended.

2. An extendable aerodynamic fairing as claimed in claim 1 including a mechanical mechanism for moving said extendable fairing section between said retracted and extended positions.

3. An extendable aerodynamic fairing as claimed in claim 2 wherein said mechanical mechanism includes an actuator having one end affixed to said fixed fairing section and the other end affixed to said extendable fairing section.

4. An extendable aerodynamic fairing as claimed in claim 1 wherein the upper and lower surfaces of said extendable fairing section are curved and wherein said extendable fairing section includes an outwardly extending arm pivotally attached to said fixed fairing section.

5. An extendable aerodynamic fairing as claimed in claim 4 including a mechanical mechanism for moving said extendable fairing section between said retracted and extended positions.

6. An extendable aerodynamic fairing as claimed in claim 5 wherein said mechanical mechanism includes an actuator having one end affixed to said fixed fairing section and the other end affixed to said extendable fairing section.

* * * * *